July 22, 1958

M. E. McCLELLAN 2,843,989

COMBINED HARVESTER AND BALER

Filed Feb. 18, 1955

INVENTOR.
M. E. McCLELLAN

July 22, 1958  M. E. McCLELLAN  2,843,989
COMBINED HARVESTER AND BALER
Filed Feb. 18, 1955  4 Sheets-Sheet 2

INVENTOR.
M. E. McCLELLAN

July 22, 1958 M. E. McCLELLAN 2,843,989
COMBINED HARVESTER AND BALER
Filed Feb. 18, 1955 4 Sheets-Sheet 3

INVENTOR.
M. E. McCLELLAN

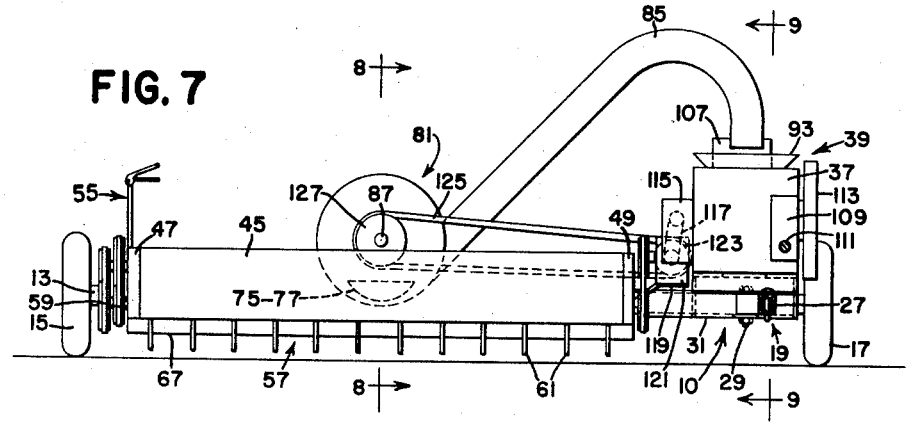
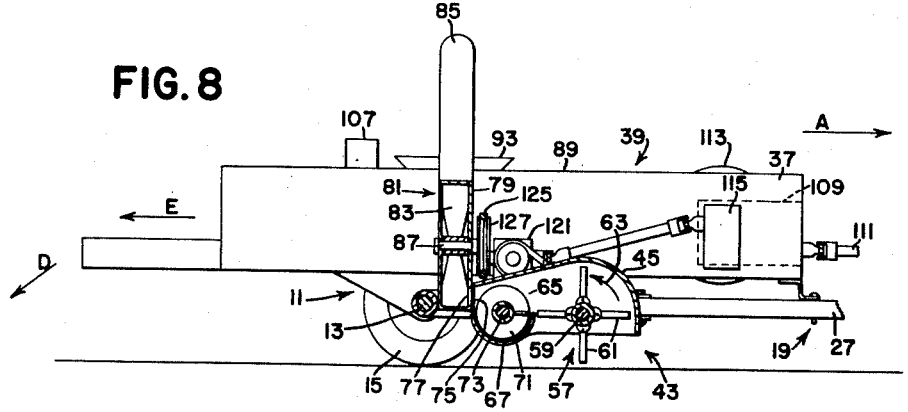
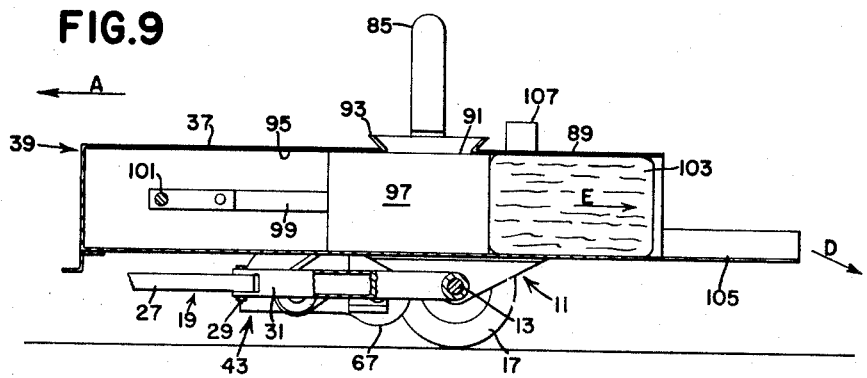

United States Patent Office 2,843,989
Patented July 22, 1958

2,843,989

COMBINED HARVESTER AND BALER

Marcus E. McClellan, Ottumwa, Iowa, assignor to Deere Manufacturing Co., Dubuque, Iowa, a corporation of Iowa Application February 18, 1955, Serial No. 489,036

12 Claims. (Cl. 56—1)

This invention relates to a combined harvester and baler and more particularly to an integrated machine that utilizes harvesting means, feeding means and baling means, wherein the harvesting means is of the self-contained type operative not only to sever crops from the ground and to pick the crops up but to reduce the crops into relatively short lengths or fragments, and the feeding means includes pneumatic means such as a blower for transferring the finely reduced crops directly to the bale case of a baling mechanism.

Balers of the type heretofore conventionally known operate on the principle of picking up from the field crops that have been previously harvested, the picked up crops being delivered either rearwardly or laterally for introduction into the feed opening of a bale case. Various forms of feeding devices have been utilized, such as augers, reciprocating packers, and the like, the purpose of which is not only to move the crops into the bale case but to pack the crops therein so that the bales being formed will be sufficiently compact as to retain their shapes when tied, it being noted in this respect that a principal defect in many balers is the inability of the packers to pack the hay or other crops into the remote or side or rear corners of the bale case.

According to the present invention, the several disadvantages of conventional balers are avoided. In the first place, since the harvesting means operates to finely reduce or lacerate the crops, there is no need for the use of slicing mechanism to slice the individual charges of hay, since the lacerated hay or crops is much more fluent than the hay gathered by the windrowing method. A further advantage resides in the utilization of the pneumatic means, such as a blower, which, because of the force developed in the blower, directs the finely reduced or lacerated crops into the bale case in such a manner as to assure uniform, compact, and shape-retaining bales.

It is a principal object of the invention to provide an inexpensive and integrated machine including the components previously described, all set forth in a novel manner but in proper operative sequence so as to achieve the utmost in efficiency and economy.

The foregoing and other important objects and desirable features inherent in and encompassed by the invention will become apparent as two preferred embodiments of the invention are disclosed in detail in the following specification and accompanying sheets of drawings, the several figures of which will be described immediately below.

Fig. 7 is a front view of the machine of Fig. 6.

Fig. 8 is a longitudinal sectional view as seen substantially along the line 8—8 of Fig. 7.

Fig. 9 is a longitudinal sectional view as seen substantially along the line 9—9 of Fig. 7.

*Figs. 1 through 5*

Figure 1:
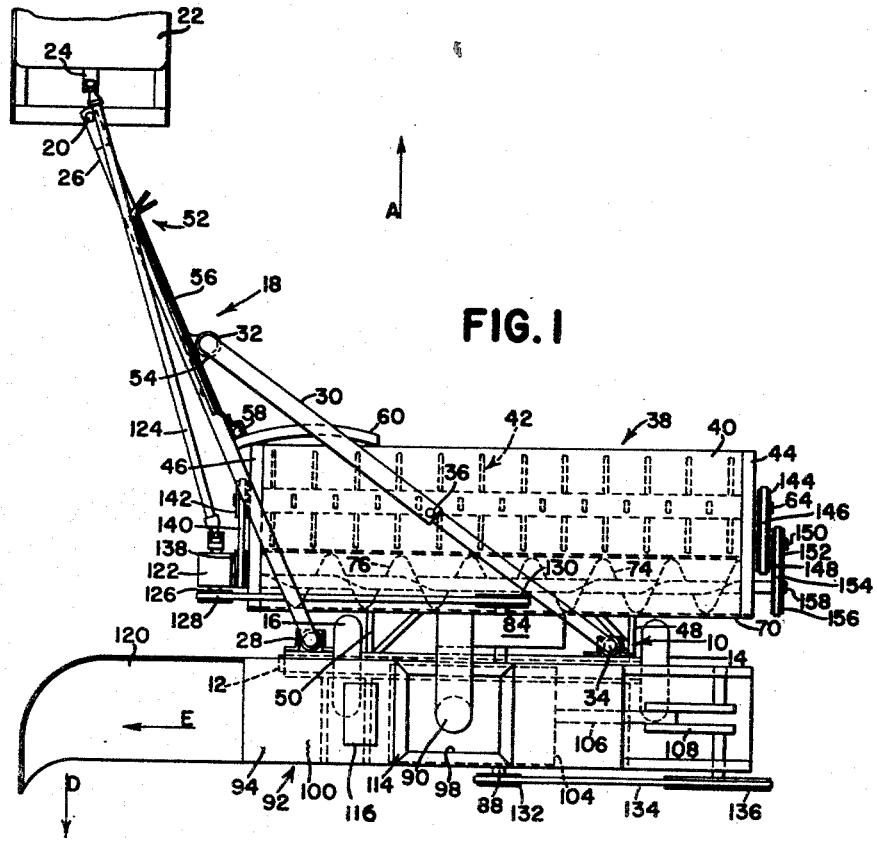
Fig. 1 is a plan view of a combined harvester and baler in which the bale case of the baling means is disposed transverse to the line of advance.
Figure 2:
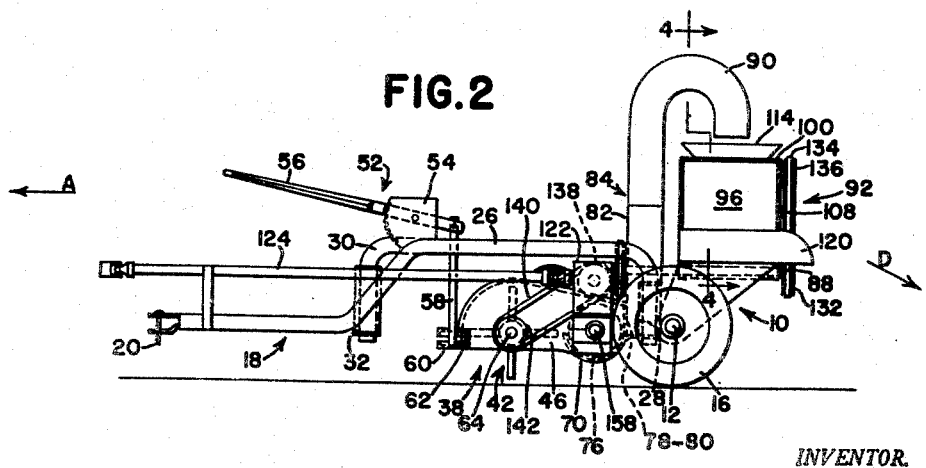
Fig. 2 is a side view of the machine shown in Fig. 1.
Figure 3:
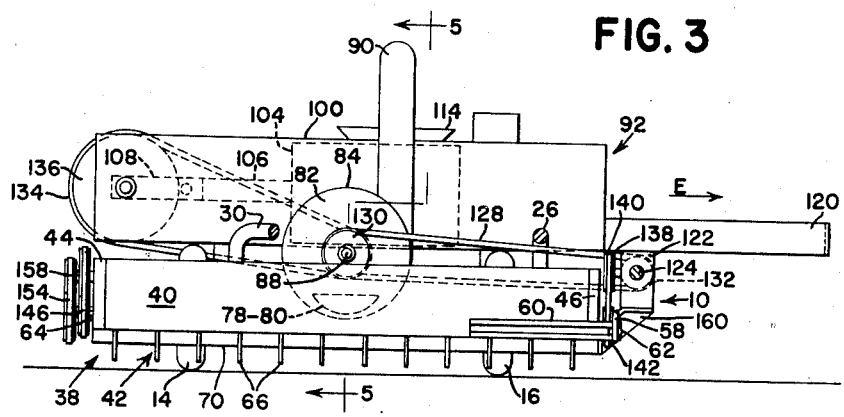
Fig. 3 is a front view of the machine shown in Figs. 1 and 2.

The machine selected for the purposes of illustration comprises a mobile main frame, designated generally by the numeral 10 and adapted to advance over a field of crops in the direction of the arrow A (Figs. 1 and 2). For this purpose, the main frame includes a transverse axle 12 having opposite ends on which are respectively journaled right- and left-hand ground-engaging wheels 14 and 16.

The main frame includes forwardly extending draft tongue structure identified in its entirety by the numeral 18, the forward end of which is pivotally connected at 20 to the drawbar of an agricultural vehicle such as a tractor, the main body of which is identified by the numeral 22. Such tractor is conventionally equipped with a rearwardly extending power take-off shaft 24 for furnishing power to the combined harvester and baler in a manner that will be presently described.

The tongue 18 comprises a main draft member 26 having its rearward end connected at 28 to the main frame 10 to provide a pivot on a vertical axis. A telescopic brace 30 is pivotally connected at 32 to the draft member 26 and is further pivotally connected at its other end at 34 to the main frame 10 on a pivot affording a vertical axis. The length of the brace 30 may be increased or decreased, as by means of a releasable pin 36. When the brace is extended, as shown in Fig. 1, it enables positioning of the tractor relative to the harvester and baler in such manner that the latter is offset to the right of the tractor, whereby the machine operates on crops that have not been trampled by the tractor wheels, all of which is conventional. When the pin 36 is released, the entire tongue may be swung to the right so that the machine will track substantially directly behind the tractor, thus decreasing the overall width of the vehicular train for purposes of transport along roads, through gates etc., which by itself is a common expedient as shown for example in the U. S. patent to Hill 2,499,500.

The draft tongue members 26 and 30 are arched so as to clear a harvesting or crop-collecting and -reducing means 38. This means is carried by the main frame and comprises an elongated hood 40 disposed with its length transverse to the line of advance. The hood is of fairly light weight but sufficiently rigid material as to represent a frame for a transverse rotor 42 on an axis transverse to the line of advance and below and within the hood 40, the hood having opposite ends 44 and 46 for partially enclosing the ends of the rotor. The entire harvesting means 38 is mounted on the main frame 10 by means such as right- and left-hand supports and braces 48 and 50 in such manner that the harvesting means as a unit may be adjusted vertically about the axle 12 as a pivot.

For the purpose of accomplishing the aforesaid adjustment, the machine includes adjusting means, designated generally by the numeral 52. This means comprises a pivoting sector 54, rigid on the draft member 26 and pivotally mounting a hand lever 56 to the rear end of which is connected a link 58. The lower end of the link is connected in a transverse arcuate channel 60 mounted along the left-hand front edge portion of the hood 40. Regardless of the position of the tongue relative to the main frame, manipulation of the lever 56 will selectively raise and lower the harvesting means 38.

The lower end of the link 58 has thereon a roller 62 which rides in the channel 60 when the tongue is swung from one position to another.

Figure 5:
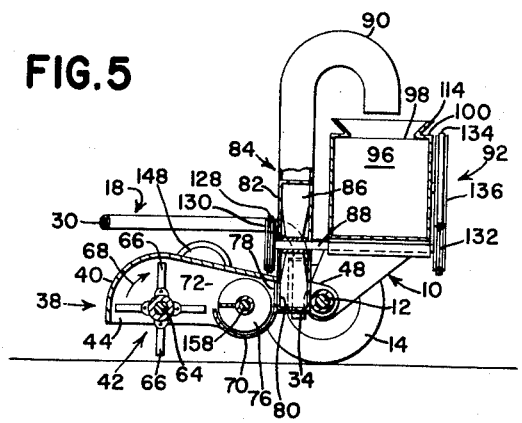
Fig. 5 is a longitudinal section as seen along the line 5—5 of Fig. 3.

As best shown in Fig. 5, the rotor 42 comprises a central rotor shaft 64 and a plurality of flail-like crop-severing and -reducing members 66, which members project normally radially outwardly from the shaft 64 when the shaft rotates in the direction of the arrow 68. As the rotor rotates as just described, it severs standing crops from the ground, simultaneously reduces or lacerates such crops and causes them to be lifted upwardly and transferred rearwardly beneath the hood 40. At the rear end of the hood is a transverse conveyor or auger trough 70, the front edge of which is spaced below the top of the hood so as to afford a crop outlet 72 substantially coextensive in length with the length of the hood 40. Therefore, crops discharged or transferred rearwardly through the outlet 72 will be in the nature of a relatively wide stream. Since the rotor 42 is of the type that picks up and lacerates crops, it is unnecessary to provide the machine with additional chopping or cutting means to further reduce the crop. Stated otherwise, the crop transferred rearwardly by the rotor 42 through the opening 72 is relatively fluent, at least as compared with crops gathered in the normal windrowing and baling process.

The auger trough 70 comprises part of conveyor means which includes right- and left-hand, oppositely wound augers 74 and 76, which represent transversely or laterally inwardly movable crop-engaging conveyor elements effective to converge the crop stream for purposes to presently appear, it being noted that the auger trough 70 is substantially coextensive in length with the elongated outlet 72 from the rotor 42.

As the augers 74 and 76 rotate, they narrow the stream of crop laterally inwardly to a central discharge opening 78 in register or fore-and-aft alinement with an inlet opening 80 in a front wall 82 of a blower housing 84, the housing being hereinafter referred to as blower means having as a component part thereof a rotary blower member or fan 86 rotatable on a fore-and-aft axis afforded by a longitudinal shaft 88. Crops entering the blower housing 84 are propelled by the blower fan 86 in a counterclockwise direction (Fig. 3) so that they exit through a blower discharge outlet in the form of an upwardly and then downwardly curved spout 90.

Figure 4:
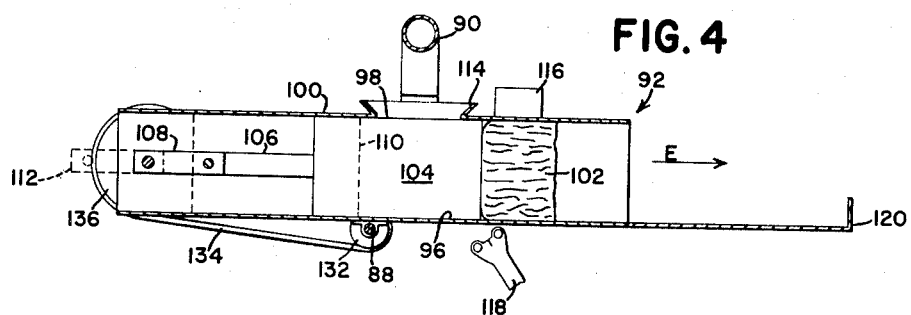
Fig. 4 is a transverse section as seen on the line 4—4 of Fig. 2.

From the description thus far, it will be seen that the harvester means 38 is carried in advance of the axle 12 and that the blower housing 84 is substantially intermediate the rear of the conveyor or auger trough 70 and the axle. To balance the components thus located ahead of the axle, the main frame includes baling means, designated in its entirety by the numeral 92, which includes a transverse bale case 94 affording a bale chamber 96 to which crops are fed by the blower spout 90 through the medium of a feed inlet opening 98 in an upper wall 100 of the bale case. It is for this reason that the discharge spout extends upwardly and then curves downwardly. Because the material, as already described, is fairly fluent, since it has been reduced or lacerated by the harvester means 38, it is readily handled by the blower and the discharge of the material directly downwardly into the bale case assures the formation of compact and shape-retaining bales, since there is no question but that the force with which the material is pneumatically delivered to the bale chamber 96 is sufficient to fill the corners of the bale case, thus affording a defect cured in conventional balers only at the expense of fairly complicated packer mechanism. The baler shown is of the type disclosed in the U. S. patent to McClellan 2,612,099; although, the baler could be of any other type. As illustrated clearly in that patent and as shown generally here, bales, such as at 102, are formed by the action of a reciprocating plunger 104, necessary movement being given to the plunger by means of a pitman 106 and crank 108. In Fig. 4, the plunger 104 is shown at the end of its compression stroke, having therefore moved past and closed the feed opening 98, pushing the material ahead of it to form the bale 102. When the plunger retracts it, again uncovers the feed inlet 98 and more material may be introduced into the chamber 96 ahead of the subsequently advancing plunger. The dotted line 110 represents the front edge of the plunger when the plunger is on its retracted stroke, and the dotted lines at 112 represent the position of the crank in retraction of the plunger. The feed inlet is flared at 114 to improve the entry of reduced material from the blower means spout 90.

As the material is continually fed to the bale chamber 96, except as modified by reciprocation of the plunger 104, blades are formed in sequence and as the individual bales are formed, they are individually tied by tying mechanism such as shown in the U. S. patent to Tuft 2,512,754, which mechanism is represented here generally as including a tier box 116 and a strand-carrying needle 118. As will be understood by those skilled in the art, there may be as many as two or three needles 118, which are cooperative to carry the wire to the tier box 116 to bind the bales 102 as they are successively formed. As the bales are completed, they are ejected in the direction of the arrow E (Figs. 1, 3 and 4), where they emerge on a tailboard 120 for ultimate discharge in the direction of the arrow D, the bales being dropped to the ground to be subsequently picked up, for example.

The sequence of operation, part of which has already been described, is as follows. As the mobile frame advances over the field, the harvesting means 38 operates to collect, reduce and transfer crops, the transferred crops moving rearwardly through the outlet 72 into the conveyor means represented by the auger trough 70 and the auger elements 74 and 76. The crop moving through the outlet 72 does so in a relatively wide stream, but the augers 74 and 76 materially narrow the crop for passage through the transfer zone 78—80 from the conveyor means to the blower means 84, after which the rotary fan 86 pneumatically delivers the crop through the spout 90 to the bale chamber 96 of the baling means 92. The plunger 104 reciprocates, as previously described, and forms the material into successive bales, and the individual bales are tied by the tying mechanism 116—118 and are ejected at E for discharge via the tailboard in the direction of the arrow D. Thus, there is provided a self-contained and integrated machine for the convenient and economical handling of forage crops, it being understood that the nature of the harvesting means 38 lends the machine to a wide variety of operations and does not limit the machine to the handling of hay or straw as in the case in conventional balers.

The drive for all mechanism just described develops from a gear casing 122 into which power is transmitted by means of a propeller shaft 124 from the power take-off shaft 24 of the tractor. The gearing (not shown) within the casing 122 drives a rear output sheave 126 which is connected by a belt 128 to a sheave 130 on the forward end of the blower fan shaft 88. The blower fan shaft projects rearwardly past the bale case and has keyed thereto a sheave 132. A belt 134 connects the sheave 132 and a sheave 136 on the plunger crank shaft 108.

The gear casing 122 drives a second output sheave 138 which is belt connected at 140 to a sheave 142 on the left-hand end of the rotor shaft 64. The right-hand end of the rotor shaft has keyed thereto a sheave 144 and this sheave is connected by a belt 146 to a large sheave 148 on an idler shaft 150 which includes in addition a small sheave 152 for driving, by means of a belt 154, a sheave 156 keyed to the right-hand end of a shaft 158 on which the augers 74 and 76 are mounted. The tying mechanism, comprising the tier box 116 and needle 118 may be driven in any suitable manner, as, for example, disclosed in the above-identified McClellan patent.

The drive casing 122 is appropriately mounted on the main frame 10, as by means of a supporting bracket 160.

Figs. 6 through 9

Figure 6:
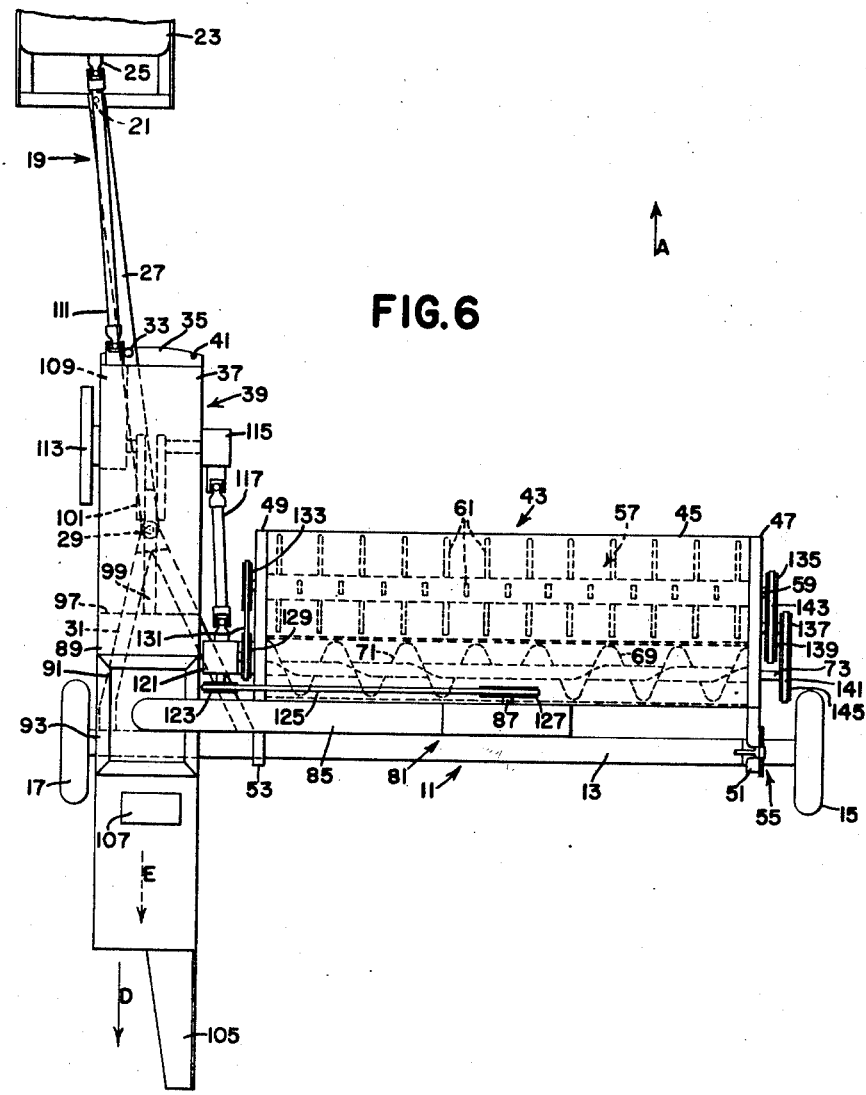
Fig. 6 is a plan view of a modified form of machine in which the bale case is parallel to the line of advance.

Many of the characteristics described in connection with the structure of Figs. 1 through 5 will be found in the presently described modification, wherein the combined harvester and baling machine is shown as having a main frame 11 adapted to advance over the field of crops in the direction of the arrow A, the frame including a transverse axle 13 and right- and left-hand wheels 15 and 17. Draft tongue structure 19 affords means for connection by a clevis pin 21 to the drawbar of a tractor 23 which is conventionally equipped with a rearwardly projecting power take-off shaft 25. In this form of the invention, the draft tongue structure 19 includes a main draft frame member 27 which is pivotally connected at 29 to a rigid sub-frame 31 fixed to the axle 13. Lateral swinging of the draft member 27 between operating and transport positions is effected by means of cooperation between a releasable lock pin 33 and an arcuate member 35 fixed to the forward end of a bale case 37 of a longitudinally disposed baler means 39. A notch 41 in the arcuate member 35 illustrates the available location of the tongue in transport position, Fig. 6 showing the tractor and towed machine in operating position, the lateral offset enabling the proper operation of harvesting means 43 so that such means may operate on crops in a swath or windrow over which the tractor wheels have not already run.

The harvesting means comprises a hood 45 having right- and left-hand end members 47 and 49, respectively, which extend rearwardly for pivotal mounting at 51 and 53 on the axle 11, whereby the harvesting means 43 may be vertically adjusted relative to the baler 39, the axle affording a transverse horizontal pivot. Adjusting mechanism is designated generally by the numeral 55, which mechanism may be of any suitable construction.

As in the case of the harvesting means 38 of the structure shown in Figs. 1 through 5, the harvesting means 43 here is mounted ahead of the axle 13. In addition to the hood 45, the harvesting means includes a transversely elongated rotor 57, which comprises a transverse rotor shaft 59 from which radially project a plurality of flail-like crop-severing and -reducing members 61.

The rotor 57 rotates in the direction of the arrow 63 (Fig. 8) to simultaneously sever, pick up and reduce crops, carrying these crops rearwardly through an outlet 65 afforded by the space between the top of the hood and the upper front edge of a transverse conveyor or auger trough 67. The auger trough is substantially coextensive in length with the rotor and therefore the outlet 65 is similarly of coextensive length, therefore affording a delivery zone for a relatively wide stream of reduced and lacerated crops.

Right- and left-hand augers 69 and 71, respectively, keyed to a transverse auger shaft 73, function as laterally or transversely inwardly movable conveyor elements to converge or narrow the stream of crops for delivery through a relatively narrow discharge opening 75 in fore-and-aft alinement or register with an inlet opening 77 in a front radial wall 79 of the housing of blower means 81. A rotary member in the form of a blower fan 83, within the blower means 81, serves as pneumatic means for propelling material out of the blower means and into the baling means 39 via a discharge spout 85. The housing of the blower means is transverse to the line of advance and is ahead of the axle 13. The fan 83 is carried on a fore-and-aft extending blower shaft 87. The bale case 37 of the baling means 39 has a top substantially horizontal wall 89 in which is a feed inlet opening 91 surrounded by a flared marginal edge 93. Thus, material picked up and lacerated by the rotor 57 is delivered through the outlet 65 in a relatively wide stream, which stream is converged by the augers 69 and 71 for transfer through the openings 75 and 77 into the blower means 81, from which the material is expelled by the fan 83 for delivery via the spout 85 directly through the baler feed opening 91 and into the bale chamber 95 afforded by the interior of the bale case 37.

As in the case of the machine shown in Figs. 1 through 7, the machine here may include as its baling means 39 the structure of the above-identified McClellan patent. As shown there, and as typical of balers in general, a reciprocating plunger, identified by the numeral 97 here, is driven via a pitman 99 and crank shaft 101 for reciprocation on alternate compression and retraction strokes. The plunger is illustrated in Fig. 9 as being at the end of its compression stroke, having formed a bale 103 which will be ejected in the direction of the arrow E upon the formation of a subsequent bale, the ejected bale moving outwardly over a tailboard 105 for discharge to the ground in the general direction of the arrow D. Individual bales are tied by tying mechanism including a tier box represented schematically at 107. Again, the tying mechanism may be of the type disclosed in the previously identified patent to Tuft.

The general position of the plunger will be appreciated from the description of the plunger 104 in the previously described modification. Suffice it to say here that when the plunger is on its compression stroke as illustrated in Fig. 9, the feed opening 91 will be closed. However, as soon as the plunger retracts, the material delivered through the feed opening 91 by the blower means spout 85 will enter the bale chamber. Again, there are present the characteristics of compactness and uniformity in the formation of bales. Successive reciprocations of the plunger 97 will form successive bales, all in a manner well known.

The forward end of the bale case 37 includes a gear casing 109 to the mechanism of which (not shown) power is transmitted from the tractor power take-off shaft 25 via a propeller shaft 111. The gear case mechanism drives the crank shaft 101, to the left-hand end of which is fixed, in a conventional manner, a flywheel 113. The opposite end of the crank shaft 101 enters a second gear casing 115 in which is mechanism (not shown) for driving a rearwardly extending short propeller shaft 117. At this point, it is to be noted that the left-hand wheel 17 is offset laterally to the left of the left-hand end 49 of the harvesting means 43, thus affording a space in which the fore-and-aft disposed baling means 39 is accommodated. Also accommodated are the drive components about to be described, including the propeller shaft 117. Mounted on the main frame 10 in any appropriate manner, as by a bracket 119, is a third gear casing 121, from which power is taken to drive the rotor 57, the auger shaft 73 and the blower fan 83.

A transverse output sheave 123, driven from the casing 121, is belt-connected at 125 to a sheave 127 that is keyed to the front end of the blower fan shaft 87. This mechanism transmits the necessary power to the fan to cause the fan to rotate in a counterclockwise direction as shown in Fig. 7. A second output sheave 129 is powered from the casing 121 and drives, via a belt 131, an input sheave 133 for the rotor shaft 59. The opposite end of the rotor shaft has keyed thereto a sheave 135 which operates through reducing drive mechanism to drive the auger shaft 73, the drive comprising a double sheave 137—139 and a pair of belts 141 and 143, the purpose of the reduction, as in the case of Figs. 1 through 5, being to reduce the speed of the augers below that of the rotor. This is accomplished because the sheave 139 is larger than the sheave 135 and the sheave 137 is larger than a sheave 145 on the auger or conveyor shaft 73.

The features of the invention are consonant with those of the machine of Figs. 1 through 5, except in this case the baling means is disposed fore-and-aft relative to the line of advance. The harvester means 43 is capable of cutting a relatively wide swath or windrow, and has the further characteristics of picking up and reducing the crops at the same time. Thus, the harvester means 43, as in the case of the harvester means 38 of the other form of the invention, constitutes the sole means for reducing the crops, rendering the crops sufficiently fluent so that they can be handled by the pneumatic conveying means represented by the blower means 81. The feeding mechanism comprising the augers 69 and 71 and the blower means 81 utilizes not only the narrowing of the relatively wide stream of crop but also the pneumatic delivery of crops via the discharge spout 85 into the baling means, thereby assuring precompaction of the material and filling of the corners of the bale case so that the bales formed by the plunger are uniform and have the characteristic of retaining their shapes.

Summary

In both forms of the invention, the basic characteristics of harvesting, feeding and baling are present, which components in each case are modified by the features of harvesting by means that reduces and lacerates the crops sufficiently to render them fluent for handling by the pneumatic means for ultimate delivery to the baling means. Thus, there is avoided complicated feeding and conveying systems, enabling the manufacture of a machine on the basis of a simple and economical design. Another features of the invention is the ability of the harvesting means to operate over a relatively wide area, whether crops are being severed immediately from the crops or whether they are being reduced from swaths or windrows previously harvested. The reduction in width of the area of crops handled by the harvesting means occurs substantially immediately after the crops leave the harvesting means but the reduction, effected by the augers as in both cases here, is of a relatively gentle nature, as is the handling by the blower means. Both the conveyor means as represented by the auger means and the blower means are substantially enclosed and there will be little if any crop loss. Consequently, the material baled will contain substantially all of the crop picked up or collected or gathered by the harvesting means, particularly the leaves which are of considerable value. As already indicated, the machines are capable of handling crops other than hay or straw.

The various features of the invention not specifically enumerated herein will undoubtedly occur to those versed in the art, as will many modifications and alterations in the preferred forms of the invention illustrated, all of which may be achieved without departing from the spirit and scope of the invention.

What is claimed is:

1. A combined harvester and baler, comprising: a mobile main frame adapted to advance over a field of crops; crop-gathering and reducing means carried by the main frame and including a rotor having an elongated shaft mounted with its axis transverse to the line of advance and a plurality of flail-like crop-reducing members carried by and projecting radially from the shaft throughout the length of said shaft, said rotor being rotatable to cause the flail-like members to sweep downwardly and longitudinally to sever the crops from the field and to simultaneously reduce the crops and then to sweep upwardly to lift the severed and reduced crops for transfer thereof rearwardly, said crop-gathering and reducing means including a hood over the rotor to confine the lifted crops and to guide them to the rear, said hood including a rear crop outlet substantially coextensive in length with the rotor; transverse conveyor means on the main frame rearwardly of and substantially coextensive with the crop outlet for receiving crops from the rotor via said outlet, said conveyor means including a relatively narrow rearwardly disposed discharge opening and said conveyor means further including crop-engaging conveyor elements operative to move the received crops transversely to and rearwardly through said discharge opening; blower means carried by the main frame and including a housing having an inlet aligned with and for receiving crops from the aforesaid discharge opening, an outlet and a rotary fan operative to propel the crops forcefully through said outlet; baling means on the main frame, including a bale case having a feed opening aligned with and for receiving crops directly from the blower means outlet so that such crops are preliminarily compacted in the bale case from the force of the crop discharge from the blower means outlet, and baling mechanism in the bale case for forming the received and preliminary compacted crops into bales; and means on the main frame for driving the rotor, the conveyor elements, the blower fan and the baling mechanism.

2. The invention defined in claim 1, in which: the main frame includes a pair of transversely spaced apart ground-engaging wheels coaxial on an axis behind the rotor; and the bale case is transverse to the line of travel and is disposed behind the wheel axis.

3. The invention defined in claim 1, in which: the main frame includes a pair of transversely spaced apart ground-engaging wheels coaxial on an axis behind the rotor; one of said wheels being offset laterally beyond the proximate end of the rotor to afford a transverse space; and the bale case is disposed fore-and-aft and extends through said space.

4. The invention defined in claim 1, in which: the discharge opening in the conveyor means is located substantially centrally of said means; the conveyor elements include coaxial oppositely wound augers respectively delivering laterally to said discharge opening; the blower means is arranged with the blower fan axis fore-and-aft; and the blower means housing has a front wall disposed radially to said fan axis and having the aforesaid inlet directly in register with said discharge opening.

5. The invention defined in claim 4, in which: the bale case is disposed transverse to the line of advance and behind the blower housing, said bale case having an upper wall in which the aforesaid feed opening is formed and said feed opening being below and substantially in fore-and-aft alignment with the blower means; and the blower means outlet includes a discharge spout directed downwardly into said feed opening so as to increase the force of crop discharge from said blower means outlet.

6. The invention defined in claim 4, in which: the bale case is disposed fore-and-aft and is transversely spaced from the blower means, said bale case having an upper wall in which the feed opening is formed; and the blower means outlet includes a lateral discharge spout connected at one end to the blower housing and having its other end directed downwardly into the feed opening of the bale case.

7. The invention defined in claim 1, in which: the bale case has an upper, generally horizontal wall and said wall has the feed opening therein; and the blower means outlet includes a discharge spout directed downwardly into said feed opening so as to increase the force of crop discharge from said blower means outlet.

8. The invention defined in claim 1, in which: the bale case is rigid on the main frame; the crop-gathering and reducing means is carried by the main frame via means including a transverse pivot about which said crop-gathering and reducing means may move vertically relative to the bale case; and adjusting means on the main frame is operatively connected to the crop-gathering and reducing means for varying the height thereof relative to the ground.

9. A combined harvester and baler, comprising: a main frame adapted to advance over a field of crops; harvesting means on the main frame and including a transverse elongated hood spaced above the ground and a crop-harvesting and reducing rotor below the hood and substantially coextensive therewith, said rotor having its axis transverse to the line of advance and being rotatable to sever, pick up and finely reduce the crops, said harvesting means comprising the sole mechanism for picking up and reducing the crops; blower means on the main frame and having a housing provided with a relatively narrow crop inlet, said housing further having a crop outlet and a rotary fan for propelling crops through said outlet; conveyor means on the main frame for receiving reduced crops from the havesting means and for conveying said crops into the blower means inlet; and baling means on the main frame and having a feed opening directly receiving crops from the blower means outlet.

10. A combined harvester and baler, comprising: a main frame adapted to advance over a field of crops; harvesting means on the main frame and including a transverse elongated hood spaced above the ground and a crop-harvesting and reducing rotor below the hood and substantially coextensive therewith, said rotor having its axis transverse to the line of advance and being rotatable to sever, pick up and finely reduce the crops, said harvesting means comprising the sole mechanism for picking up and reducing the crops and said harvesting means including a crop outlet substantially coextensive with the hood for discharging reduced crops rearwardly in a relatively wide stream; baling means on the main frame and having a feed opening materially narrower than said stream; and conveyor and feed means on the main frame and having a wide portion receiving the stream from the harvesting means, a narrow portion discharging directly into the baling means feed opening, and elements operative to narrow the stream between said wide and narrow portions.

11. A combined harvester and baler, comprising: a main frame adapted to advance over a field of crops and including harvesting means, conveyor means, feeding means and baling means in the order named for harvesting, reducing and baling crops, characterized in that: the harvesting means is relatively wide transversely of the line of advance and is operative to simultaneously sever, reduce, pick up and transfer crops rearwardly to the conveyor means in a relatively wide crop stream; the conveyor means is effective to receive and narrow said stream for exit through a relatively narrow discharge opening; and the feeding means comprises a blower having an inlet in register with the discharge opening and an outlet delivering directly and forcefully to the baling means.

12. A combined harvester and baler, comprising: a mobile main frame adapted to advance over a field of crops; crop-collecting means on the frame for picking up crops and including an outlet for the crops; baling means on the frame, having a feed opening spaced from the aforesaid outlet; and feed means on the main frame for receiving crops from said outlet and including pneumatic means for delivering the crop directly and forcefully to the baling means.

References Cited in the file of this patent

UNITED STATES PATENTS

| | | |
|---|---|---|
| 1,099,216 | Tuttle | June 9, 1914 |
| 2,318,229 | Jones | May 4, 1943 |
| 2,362,861 | Russell | Nov. 14, 1944 |
| 2,496,493 | Raney | Feb. 7, 1950 |
| 2,663,985 | Hinson | Dec. 29, 1953 |